No. 876,316. PATENTED JAN. 14, 1908.
E. J. BLOOM.
VALVE.
APPLICATION FILED NOV. 14, 1905.
2 SHEETS—SHEET 1.
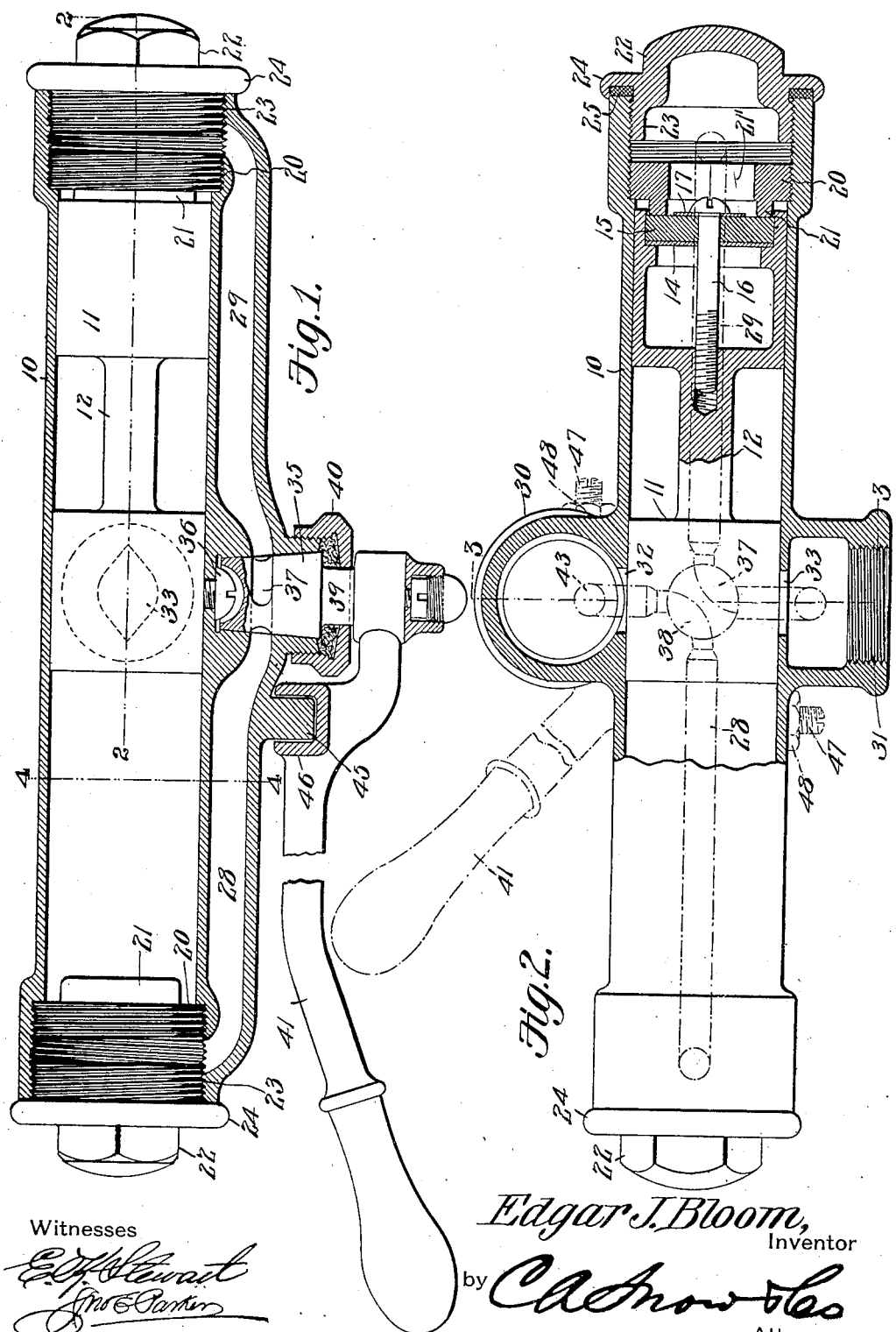
Witnesses
Edgar J. Bloom, Inventor
by _____ Attorneys

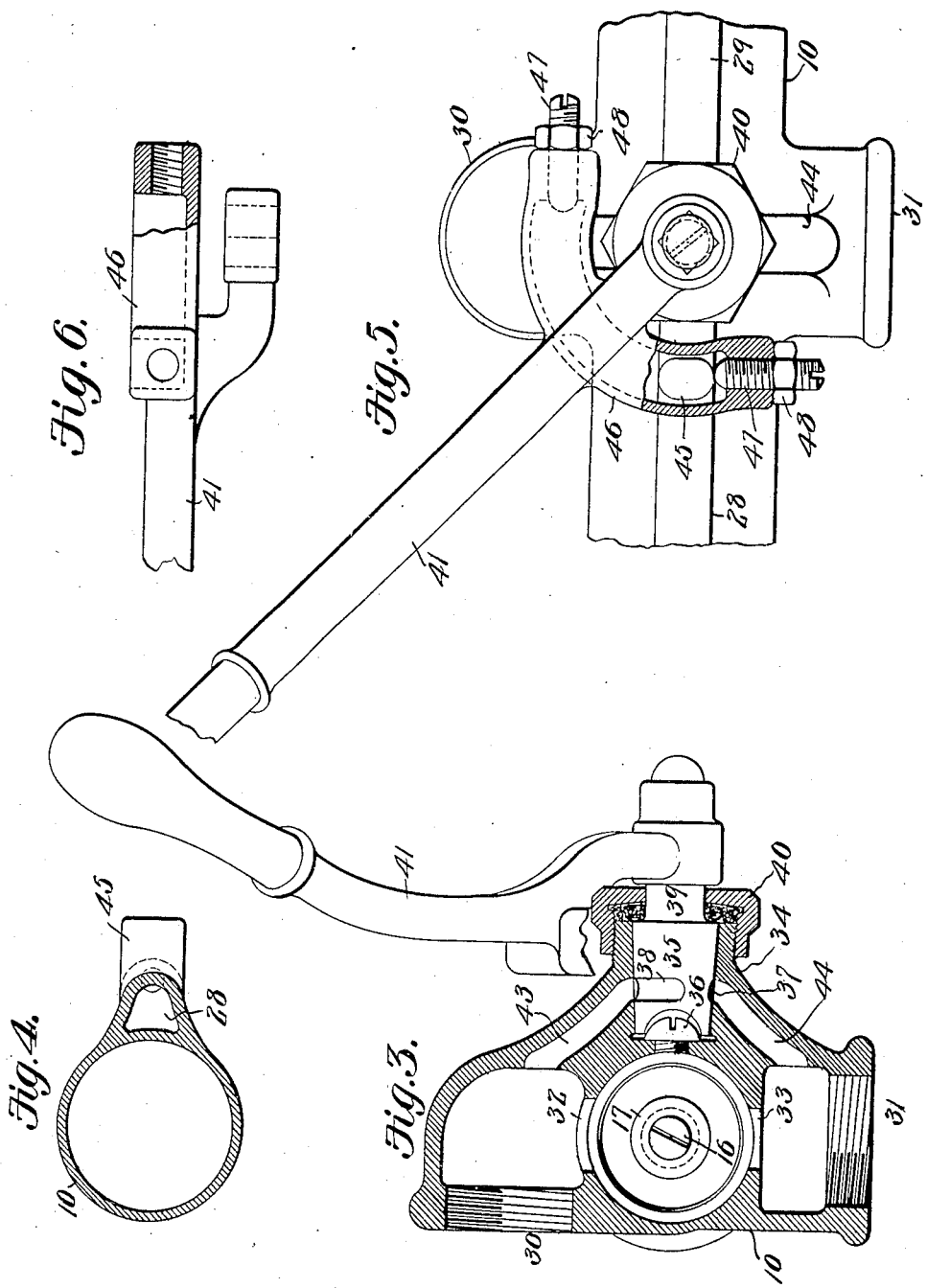

UNITED STATES PATENT OFFICE.

EDGAR J. BLOOM, OF TIFFIN, OHIO.

VALVE.

No. 876,316.  Specification of Letters Patent.  Patented Jan. 14, 1908.

Application filed November 14, 1905. Serial No. 287,309.

*To all whom it may concern:*

Be it known that I, EDGAR J. BLOOM, a citizen of the United States, residing at Tiffin, in the county of Seneca and State of Ohio, have invented a new and useful Valve, of which the following is a specification.

This invention relates to improvements in flushing valves, and has for its principal object to provide an improved construction of valve in which the valve member is in the form of a double ended piston which is moved at greater or less speed by fluid pressure.

Other objects of the invention are to simplify the construction of the valve, to reduce its cost, and so arrange the ports as to prevent water hammer, and secure the proper filling of the bowl after the main flush.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a sectional plan view of a flushing valve constructed in accordance with the invention. Fig. 2 is an elevation of the same, partly in section on the line 2—2 of Fig. 1. Fig. 3 is a transverse sectional view of the valve on the line 3—3 of Fig. 2. Fig. 4 is a transverse section through the main valve casing on the line 4—4 of Fig. 1. Fig. 5 is a detail elevation, partly in section, of the central portion of the valve casing, showing the valve operating handle, and the means employed for limiting its movement. Fig. 6 is a detail view of the valve operating handle detached.

Similar numerals of reference are employed to indicate corresponding parts throughout the several figures of the drawings.

The main barrel or casing 10 of the valve is cylindrical in form, and is bored for the reception of a double ended piston 11, the piston heads being connected by an integral stem 12. Each piston member is counter-bored to form a cylindrical recess at its outer end, and in said recess is placed a metal washer 14, and a packing disk 15 formed of rubber or similar material that is held in place by a screw 16 and washer 17, the screw extending into a threaded opening formed in the main body of the piston, and the packing disk being held firmly in place prevents the water from the interior of piston dislodging the washer 14 and packing disk 15.

Each end of the cylinder is counter-bored and provided with internal threads, and into this threaded portion of the cylinder is screwed a seating ring 20 having an inwardly projecting annular flange 21 against which the rubber disk 15 finds a seat. The central portion of this ring has a non-circular opening 21' into which a suitable tool may be introduced for forcing the ring to position. This non-circular opening extends only part way through seating ring 20 and the annular extension upon which packing disk 15 rests is round outside and inside.

After the ring has been screwed into place, the end of the cylinder is closed by a cap 22, having a threaded flange 23 that screws into the threads of the cylinder, and being further provided with an annular flange 24, having a recess for a packing ring 25 that is forced against the end of the cylinder. The arrangement is such that at each end of the cylinder an open water space is formed between the cap 22 and the seating ring 20, and with these water spaces communicate passages 28 and 29, respectively. At the central portion of the cylinder are arranged the inlet 30 and outlet 31, the inlet 30 being connected to the water supply pipe, and the outlet 31 leading to the bowl. In the upper side of the cylinder is an inlet port 32, and at the lower side is an outlet port 33, these ports being diametrically opposite each other, and normally closed by one of the piston heads. During movement of the piston from one end of the cylinder to the other, the ports 32 and 33 are opened and closed, the quantity of water passing from the inlet to the outlet port around the small portion 12 between the heads of the double ended piston being controlled by the speed at which the piston travels.

At one side of the central portion of the cylinder is an enlarged boss 34. This boss is bored out to receive a tapered four-way cock 35, and the opening that is formed between the cock receiving chamber and the main cylinder is threaded for the reception of a screw 36 which is turned home, and its inner end is finished to conform to the bore of the cylinder in order not to interfere with the movement of the piston. This screw will prevent the water passing into the chamber and forcing the cock from its seat.

The cock is provided with two ports 37 and 38, and at its outer end is a stem 39, passing through an opening formed in a cap or gland nut 40, a suitable packing being introduced at this point to prevent leakage. To the outer end of the stem is secured an operating handle 41, by which the cock may be moved from one position to the other, the cock having a movement which may be varied from 0° to 45° in each direction.

The three passages 28, 29 and 43 are reduced in diameter at the point where they communicate with the chamber, so that the size of the chamber and cock may not be rendered unnecessarily large while the main passages are of sufficient diameter to permit coring. The ends of ports 32 and 33 are elongated as shown, so that the piston heads may close these ports gradually and thus both lessen water hammer and give time for the refill of the bowl after flushing.

Leading from the main inlet chamber to the valve chamber is a port 43, the area of which is contracted at the point where it communicates with the valve chamber, and leading from the opposite side of said chamber to the outlet is a discharging port 44 that is opened for its full area from end to end in order to permit the free passage of water. The drain passage 44 is larger than the other three passages, so that the adjustment may be made at the supply passage 43 and always have the drain passage 44 open.

The main casting is provided with a stop lug 45, adjacent to the valve stem 39, and over this lug fits a pair of arms 46 extending from opposite sides of the operating lever 41, the arms being grooved for the reception of said lug. In the outer end of each arm is a threaded opening for the reception of a stop screw 47 which may be adjusted to proper position and then locked by a nut 48. The contact ends of the stop screws and the periphery of the lug 45 are rounded to give a better contact between them in stopping the movement at the desired point.

When the parts are in the position shown in Figs. 1 and 2, that portion of the cylinder to the left is filled with water, being in communication with the inlet through the ports 43, 38 and 28. The piston is held in this position until the lever is forced down through an arc of approximately ninety degrees, which moves the cock to such position that port 38 of the cock places the ports 28 and 44 in communication and port 37 places the ports 29 and 43 in communication. Water then passes through the port 43, port 37 and port 29 to the right hand end of the cylinder, and acts on the piston, forcing the latter slowly to the left, and at the same time the water at the left hand end of the cylinder escapes through the port 28, port 38, and port 44. As the piston moves across the alining elongated ports 32 and 33, the water will flow to flush the bowl, and as the ports are gradually closed, the flushing operation will cease, and sufficient water will flow gently to the bowl for the purpose of filling the latter. The piston will come to its seat gradually without shock or jar, owing to the water which is being pushed ahead of the piston, the operation of the valve being practically noiseless.

It will be observed that the area of the inlet 30 is much greater than the combined areas of all ports leading to the casing and four way cock chamber, so as to maintain a constant pressure on said fluid pressure operated piston to the end of the stroke.

The main water way outlet 33 is covered by one head of the double ended piston, when piston is at the end of its stroke and is held down in place by pressure of main water supply. The cushions 15 in cylindrical cavity at each end of piston are held by main water pressure against annular extensions on seating ring 20, thus closing off leakage of water at drain and main outlet port. This does away with a tight fitting piston and prevents leakage.

Having thus described the invention, what is claimed is:—

1. In a flushing valve, a cylindrical casing having inlet and outlet ports arranged diametrically opposite each other leading thereinto, a fluid pressure operated double ended piston arranged within the cylinder and serving to open and close the ports, the opposite ends of said piston being provided with recesses, packing disks in said recesses, adjustable seating rings arranged within the ends of the cylinder for engagement with said packing rings, cap members spaced from the rings and closing the ends of the cylinder, a valve chamber, a controlling valve or cock, ports or passages leading from the valve chamber to the opposite ends of the cylinder and entering the latter between the rings and caps, and passages for placing said valve chamber in communication with the main inlet and outlet.

2. The combination in a flushing valve, of a cylindrical casing having inlet and outlet ports arranged diametrically opposite each other, a double ended piston arranged within the casing, the outer ends of the piston being recessed, yieldable packing members secured within said recesses, seating rings secured within the ends of the casing and against which the packing disks may be seated, caps for closing the ends of the casing, said caps being spaced from the rings, a controlling valve or cock arranged within a chamber in the casing, passages leading from said chamber to the opposite ends of the cylinder and entering the same between the caps and rings, an inlet passage leading from the main inlet to the chamber, the chamber ends of all of said passages being of reduced area, and an outlet passage leading from said chamber to the main outlet of uniform cross sectional area throughout its length and of greater area than the other passages.

3. The combination in a flushing valve, of a cylindrical casing having inlet and outlet ports arranged diametrically opposite each other, a double ended piston arranged within the cylinder, the opposite ends of said piston being provided with circular recesses, a washer arranged within the recess, a yieldable packing disk mounted on the washer, a screw for holding said disk in position, a seating ring for said disk, said ring having an annular extension and a non-circular opening part of the way through and being provided with peripheral threads adapted to female threads formed at the end of the cylinder, a threaded cap member for closing the end of the cylinder, said cap member having a packing ring receiving groove, a controlling valve or cock arranged in a chamber in the casing, ports or passages leading from said chamber to the spaces between the caps, and seating rings, and ports between the main inlet and outlet and said chamber.

4. The combination in a flushing valve, of the main casing having a cylindrical bore and provided with a main inlet and outlet arranged diametrically opposite each other, a double ended piston arranged within the bore, a controlling valve, there being ports under the control of said valve for establishing communication between the opposite ends of the cylinder and the inlet and outlet, a stem carried by the controlling valve or cock, an operating lever secured to the stem and provided with a pair of oppositely directed arcuate arms, the inner faces of which are grooved, a stop lug extending from the casing into said groove, and adjustable stop screws arranged at the ends of the arcuate arms and serving to engage said stop.

In testimony that I claim the foregoing as my own, I have hereto affixed my signature in the presence of two witnesses.

EDGAR J. BLOOM.

Witnesses:
  WM. H. DORE,
  FRANK T. DORE.